US005444828A

United States Patent [19]

Kataoka

[11] Patent Number: 5,444,828

[45] Date of Patent: Aug. 22, 1995

[54] DOCUMENT PROCESSING DEVICE AND METHOD

[75] Inventor: Misao Kataoka, Mie, Japan

[73] Assignee: Brother Kogyo Kabushiki Kaisha, Nagoya, Japan

[21] Appl. No.: 249,064

[22] Filed: May 25, 1994

Related U.S. Application Data

[63] Continuation of Ser. No. 826,527, Jan. 27, 1992, abandoned.

[30] Foreign Application Priority Data

Feb. 28, 1991 [JP] Japan .................................. 3-059449

[51] Int. Cl.[6] .................................. G06F 15/00

[52] U.S. Cl. .................................. 395/117; 395/149

[58] Field of Search ............... 395/102, 105, 115, 116, 395/117, 137, 146, 147, 148, 149, 153, 101, 157; 382/56, 61; 400/61-62, 68

[56] References Cited

U.S. PATENT DOCUMENTS 4,970,665 11/1990 Dui .................................. 395/137
4,998,832 3/1991 Okimoto et al. .
5,038,392 8/1991 Morris et al. .................................. 382/61
5,297,245 3/1994 Kitamuro et al. .................. 395/149

FOREIGN PATENT DOCUMENTS

0066047A2 12/1982 European Pat. Off. .
2194488 3/1988 United Kingdom .
2219424 12/1989 United Kingdom .

*Primary Examiner*—Arthur G. Evans
*Attorney, Agent, or Firm*—Oliff & Berridge

[57] ABSTRACT

A document processing device and method performs print position setting of an item content to be printed on a paper sheet, while ascertaining the appearance (layout) that the selected print position setting will produce if printed, by displaying the appearance on a display screen. In the document processing method and device, upon operation of a print key after the size of a paper sheet is stored in memory, plural item-titles, item signs (representing the item-titles) and a block cursor are displayed on an item-title displaying area of the display screen. At the same time the title displaying area is displayed, a paper-imitating area having an outline is also displayed on the display screen. By operating, for example, a cursor shift key and a space key, the block cursor is shifted within the title displaying area to select an item-title, and then the cursor is displayed within the paper-imitating area. Upon operation of, for example, a return key after the cursor is shifted to a desired position by operating, for example, the cursor shift key, an item sign corresponding to the selected item-title is displayed at the display position of the cursor in the paper-imitating area. A selected item content can then be printed on a paper sheet at a position on the paper corresponding to the position where the item sign is displayed in the paper-imitating area.

21 Claims, 20 Drawing Sheets

FIG. 4B

| ITEM | INSTRUCTION |
|---|---|
| S11 | READ OUT ITEM TITLE |
| S12 | DISPLAY ITEM TITLE AND ITEM SIGN ON ITEM TITLE DISPLAYING AREA |
| S13 | DISPLAY PAPER-IMITATING AREA |
| S14 | DISPLAY BLOCK CURSOR ON TOP ITEM TITLE |
| S15 | KEY INPUT? |
| S16 | CURSOR SHIFT-DOWN KEY INPUT? |
| S18 | CURSOR SHIFT-DOWN PROCESSING |
| S20 | CURSOR SHIFT-UP KEY INPUT? |
| S22 | CURSOR SHIFT-UP PROCESSING |

FIG. 5B

| ITEM | INSTRUCTION |
|---|---|
| S24 | SPACE KEY INPUT? |
| S25 | PRINT POSITION DISPLAY PROCESSING |
| S26 | CORRECT KEY INPUT? |
| S30 | CANCEL KEY INPUT? |
| S31 | CEASE PROCESSING |
| S32 | ENDING PROCESSING |
| S33 | RETURN KEY INPUT? |
| S37 | DETERMINE PRINTING POSITION FOR SET PF(KF) |
| S38 | STORE ITEM TITLE AND PRINT POSITION |
| S41 | SOUND ALARM |

FIG. 6B

| ITEM | INSTRUCTION |
|---|---|
| S50 | ERASE BLOCK CURSOR |
| S55 | DISPLAY ITEM TITLE |
| S56 | DISPLAY BLOCK CURSOR |

FIG. 7B

| ITEM | INSTRUCTION |
|---|---|
| S60 | ERASE BLOCK CURSOR |
| S65 | DISPLAY ITEM TITLE |
| S66 | DISPLAY BLOCK CURSOR |

FIG. 8B

| ITEM | INSTRUCTION |
|---|---|
| S71 | ERASE ITEM SIGN FOR PF(KF) AND PRINT MARK |
| S74 | DISPLAY CURSOR ON PAPER-IMITATING AREA |
| S75 | KEY INPUT? |
| S76 | CURSOR SHIFT-RIGHT KEY INPUT? |
| S81 | CURSOR SHIFT-DOWN KEY INPUT? |
| S86 | CURSOR SHIFT-LEFT KEY INPUT? |

FIG. 9B

| ITEM | INSTRUCTION |
|---|---|
| S91 | CURSOR SHIFT-UP KEY INPUT? |
| S96 | CANCEL KEY INPUT? |
| S98 | ERASE CURSOR |
| S99 | RETURN KEY INPUT? |
| S100 | ITEM SIGN AT CURSOR POSITION? |
| S103 | DISPLAY ITEM SIGN FOR PF(KF) AND PRINT MARK |
| S107 | SOUND ALARM |
| S110 | DISPLAY CURSOR BASED ON CSCP AND CSLP |

DOCUMENT PROCESSING DEVICE AND METHOD

This is a continuation of application Ser. No. 07/826,527 filed Jan. 27, 1992, now abandoned.

BACKGROUND OF THE INVENTION

1. Field of the Invention

This invention relates to a document processing device and method, and more particularly to a document processing device and method in which printing positions of plural items to be printed on a print paper (e.g., a paper sheet) can be determined by using a paper-imitating area displayed on a display screen.

2. Discussion of Related Art

A word processor or an electric typewriter equipped with a display having a display for displaying print information over several lines in a group, are known in which address information including, for example, names, addresses and telephone numbers for many customers (clients) can be prepared and maintained (hereinafter referred to as an "address book function"), or a desired item (or items) (e.g, name and address) of the address information can be printed onto a label paper (hereinafter referred to as a "label printing function").

In the word processor or typewriter including the address book function or the label printing function, the address information is classified for every client by making and storing a correspondence between plural item-titles such as "name" and "address" prepared in an address-book preparing mode and item contents (the actual names and addresses to be stored and printed). This information is conventionally stored in a data memory in advance, whereby at some later time, the contents of desired items can be easily printed on a label paper which would then be attached to a letter or package to be mailed, etc.

In order to set the printing position of an item content to be printed on the label paper (that is, in order to position the printing carriage on the label paper) in the word processor or electric typewriter as described above, the label paper is first actually placed in a printing mechanism (printer), a carriage is manually shifted to a desired position on the label paper to set the printing position of the item content, and then an item-title (for example, NAME) for the item content to be printed (the actual name) at the desired printing position is selected and printed. In another example, printing positions of plural item contents to be printed on the label paper are set on the basis of a print-position setting value comprising a line number and a column number selected from a print-position setting menu. Both of these manners for setting printing positions commonly require a tentative printing operation (a test run), and if a print appearance (or layout) resulting from the test run is unsatisfactory, the printing position(s) must be altered by further shifting the carriage or altering the print-position setting value.

As described above, the conventional word processor or typewriter having the address book function and the label printing function requires the tentative printing operation to be performed in which the label paper is actually placed in the printer and the carriage is manually shifted, or requires a print-position setting operation to be performed in which the printing positions of the item contents to be printed are individually set using a print-position setting value of line and column numbers for every item content. Therefore, the conventional word processor or typewriter has disadvantages in that the print-position setting for an item content is complicated, and an actual printing operation must be carried out to ascertain the print appearance (or layout).

SUMMARY OF THE INVENTION

An object of this invention is to provide a document processing device and method for displaying (on a display screen) a paper-imitating area having a display profile corresponding to the shape of a print paper (for example, a label), and also for displaying a character (or other symbol) that designates a desired item-title at a location in the paper-imitating area that corresponds to the location where the time contents will be printed on the print paper, to thereby easily perform a print-position setting operation while ascertaining print appearance (or layout) of an item content of the item-title on the display (without performing a test run).

To achieve the foregoing and other objects, and to overcome the shortcomings discussed above, a document processing method according to the invention can use a document processing device which performs a printing operation for a document in accordance with data regarding items and printing positions which are stored in a memory, and which comprises: input means for inputting characters (including symbols) constituting address information and various types of instructions; a data memory for storing item-title data for plural items determined in advance (pre-determined), and item-content data which are input in correspondence with the respective item-titles in such a manner that the item-title data and the item-content data are matched with each other; display means including a display unit capable of displaying characters on several lines, the display means including an item-title displaying area on which item-titles are displayed, and a paper-imitating area having a display profile corresponding to the shape of a print paper; display control means for controlling the display means to display plural item-titles, read from the data memory, in the item-title displaying area in accordance with a display instruction supplied from the input means; selecting means for selecting a desired item-title from the item-titles displayed on the item-title displaying area; indicating means for indicating a desired position for a selected item-title within the paper-imitating area; and print position setting means, responsive to a print position setting instruction from the input means, for instructing the display control means to display, for example, a character for the item-title selected by the selecting means at the desired printing position within the paper-imitating area which is indicated by the indicating means, and for storing the selected item-title (or the item content thereof) and the desired printing position corresponding to the indicated position on the paper-imitating area in association with each other in a print position setting memory.

In the document processing device and method according to the present invention, when receiving the display instruction from the input means, the display control means controls the display means to display plural item-titles, read from the data memory, on the item-title displaying area of the display unit. Indicia such as a character representing each different item-title can also be displayed associated with its respective item-title in the item-title displaying area. Additionally, the display instruction causes the paper-imitating area, having a display profile corresponding to the shape of a print paper on which the item contents stored in the data memory are to be printed, to also be displayed (or set up) on the display unit.

When a print position setting instruction is received from the input means, the print position setting means instructs the display control means to display the indicia representative of the item-title selected from the plural item-titles to be displayed in the paper imitating area at the position indicated by the indicating means within the paper-imitating area on the display unit. The print position setting instruction also causes the selected item-title (or the item content thereof) and the print position corresponding to the indicated display position on the paper-imitating area to be stored in association with each other in a print position setting memory. Therefore, on the basis of the item-title (or item content) and the printing position which have been stored in association with each other, the item content of the selected item-title can be accurately printed at a desired print position to provide a good print appearance (or layout).

The document processing device constructed according to the present invention includes the display control means and the printing position setting means, and causes the item-title displaying area and the paper-imitating area to be displayed by the display unit. Indicia in the form of characters (item signs) for selected item-titles are displayed in the paper-imitating area, so that the printing positions of the item contents for the selected item-titles (as designated by the displayed item signs) can be easily set without first performing a tentative printing operation since the print appearance of the item contents is ascertained on the display unit by viewing the indicia representative of the respective item-titles. Additionally, each item-title or item content and the printing position thereof on the print paper are stored in a memory in association with each other, so that the item content of the item-title for which a printing position has been set on the paper-imitating area can be accurately printed at the desired printing position on the print paper in correspondence with the printing position displayed in the paper-imitating area.

BRIEF DESCRIPTION OF THE DRAWINGS

The invention will be described in detail with reference to the following drawings in which the like reference numerals refer to like elements, and wherein:

FIGS. 4A and 4B are a flowchart and table of a first part of a printing position setting routine;

FIGS. 5A and 5B are a flowchart and table of a second part of the print position setting routine of FIGS. 4A and 4B;

FIGS. 6A and 6B are a flowchart and table of a third part of the print position setting routine of FIGS. 4A and 4B;

FIGS. 7A and 7B are a flowchart and table of a fourth part of the print position setting routine of FIGS. 4A and 4B;

FIGS. 8A and 8B are a flowchart and table of a fifth part of the print position setting routine of FIGS. 4A and 4B;

FIGS. 9A and 9B are a flowchart and table of a sixth part of the print position setting routine of FIGS. 4A and 4B;

DETAILED DESCRIPTION OF THE INVENTION

The following description of the document processing device of the present invention is made with reference to a word processor for preparing an English document equipped with the above-described address book function and label printing function. The word processor used in this embodiment has a conventional print mechanism PM and a display mechanism DM, for example, as disclosed in U.S. Pat. No. 4,998,832 (corresponding to British Unexamined Provisional Patent Publication No. 2219424 A), the disclosure of which is incorporated herein by reference.

Figure 1:
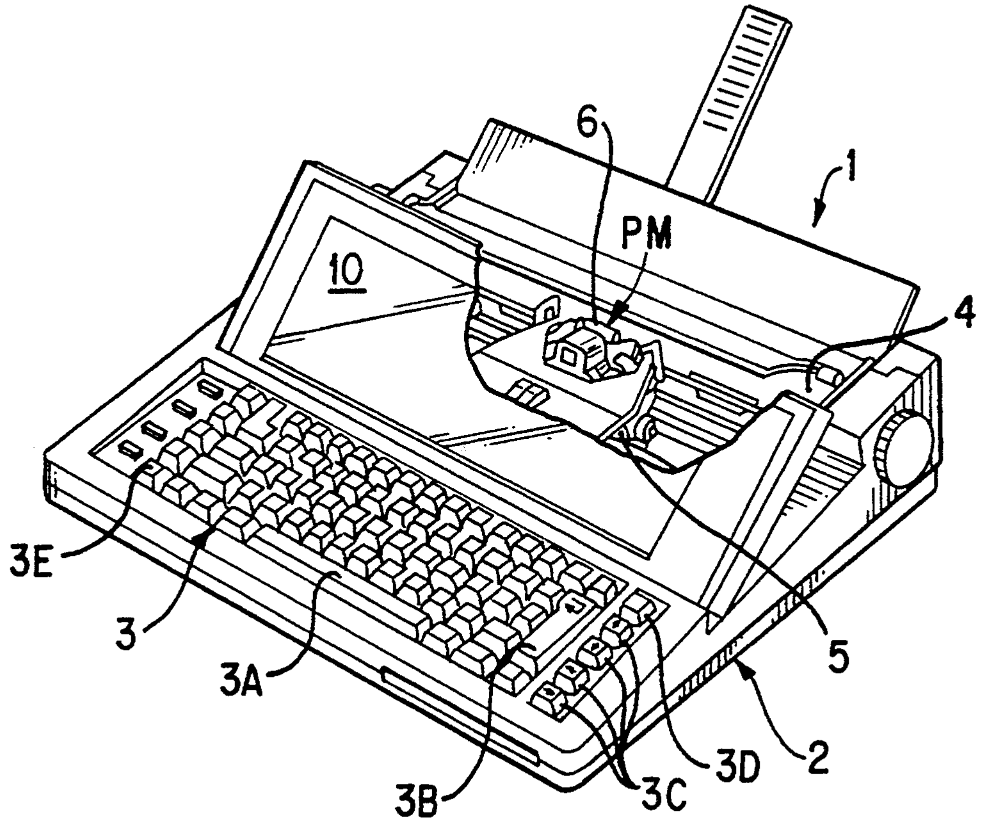
FIG. 1 is a perspective view of a word processor to which a document processing device of the present invention is applied.

As shown in FIG. 1, the word processor 1 is equipped with a keyboard 3 at a front portion of a body frame 2 thereof, a printing wheel type of printing mechanism PM disposed behind the keyboard 3 and within the body frame 2, and a liquid crystal display 10 disposed behind the keyboard 3 for displaying characters (including symbols) over, for example, 14 lines in a group.

The keyboard 3 is provided with character keys (including alphabet keys, numeral keys and symbol keys), a space key 3A, a return key 3B, cursor shift keys 3C for shifting a cursor 43 in upward, downward, left and right directions, a cancel key 3D for ceasing a processing operation which currently is being executed, a print key 3E and other various types of function keys, as are typically provided on conventional keyboards.

The printing mechanism PM is of a conventional type which includes a platen 4, a carriage 5, and a type-wheel 6.

Figure 2:
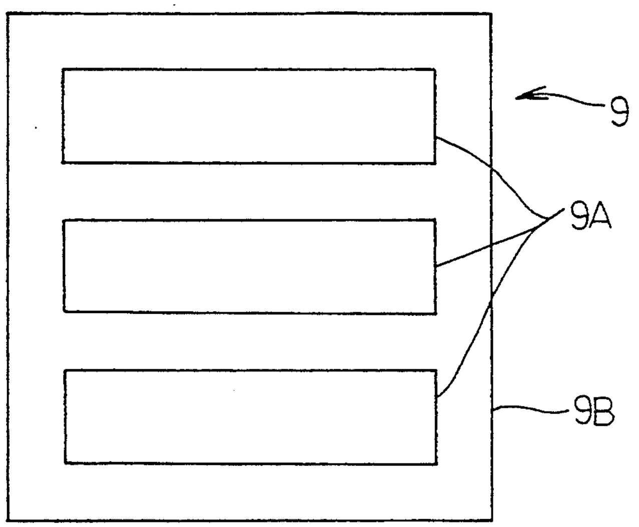
FIG. 2 is a schematic plan view of a label paper.

FIG. 2 shows an example of a label paper on which print information can be printed by the printing mechanism PM. The label paper 9 comprises a base paper 9B and plural labels 9A attached on the base paper 9B. The print information can be printed on each label 9A by the printing mechanism PM. The print information is printed on each label 9A, but is not printed in spaces between the neighboring labels 9A because the carriage is conventionally controlled to be passed over these spaces without performing a printing operation in accordance with data which is stored in a ROM 17 in advance. The label paper 9 is similar to a well-known paper as, for example, disclosed in British Unexamined Published Patent Application No. 2194488A.

Figure 3:
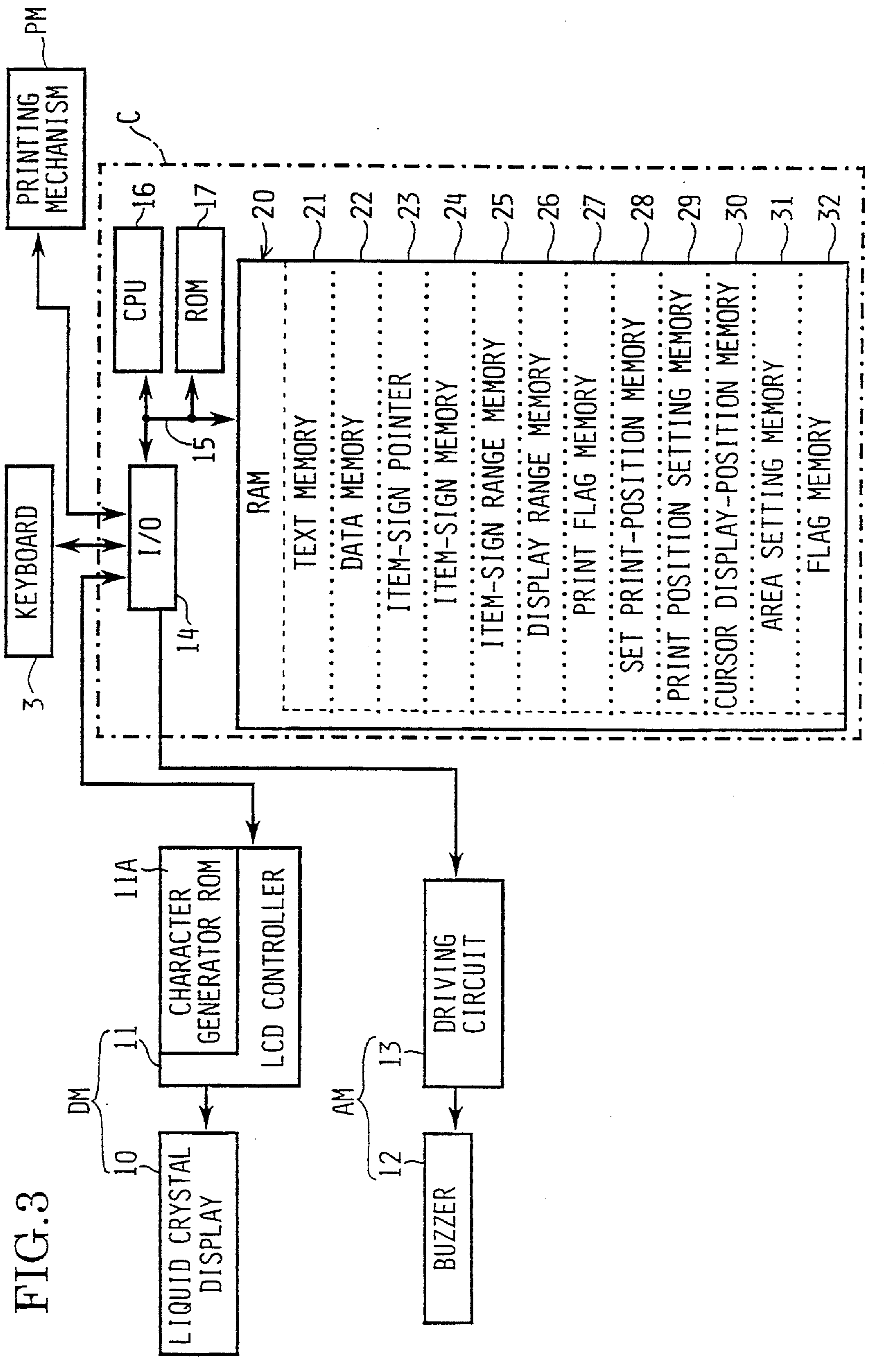
FIG. 3 is a block diagram of a control system of the FIG. 1 word processor.

FIG. 3 is a block diagram of a control system for the word processor of FIG. 1. The control system comprises various types of units as described below.

A display mechanism DM is of a conventional type which includes a liquid crystal display 10, and a display controller (LCD controller) 11 having a display RAM for outputting display data to the display 10, and a character generator ROM 11A for storing a number of dot patterns for characters.

An alarm mechanism AM includes a buzzer 12 and a driving circuit 13 for causing the buzzer to sound an alarm.

A control device C comprises a CPU 16, an input-/output(I/O) interface 14 connected through a bus 15 as a data bus to the CPU 16, ROM 17 and a RAM 20.

A program memory of the ROM 17 includes: a display control program for controlling the display mechanism DM in accordance with code data which is input from the keyboard 3; a control program for storing the code data in a text memory 21 or a data memory 22; an address-book managing program for storing item-content information for many clients in the data memory as address-book data; an address-book display control program for displaying the item-content information on the display 10 in a tabular style; a print-position setting control program for setting a desired position on the paper-imitating area PE for an actual printing operation of the item-content information on the label paper 9; and a label printing control program for reading from the data memory 22 item-content information for plural items for which printing positions are set, and for controlling the printing mechanism PM to successively print the read-out item-content information at the set printing positions on the label 9A.

Figure 10:
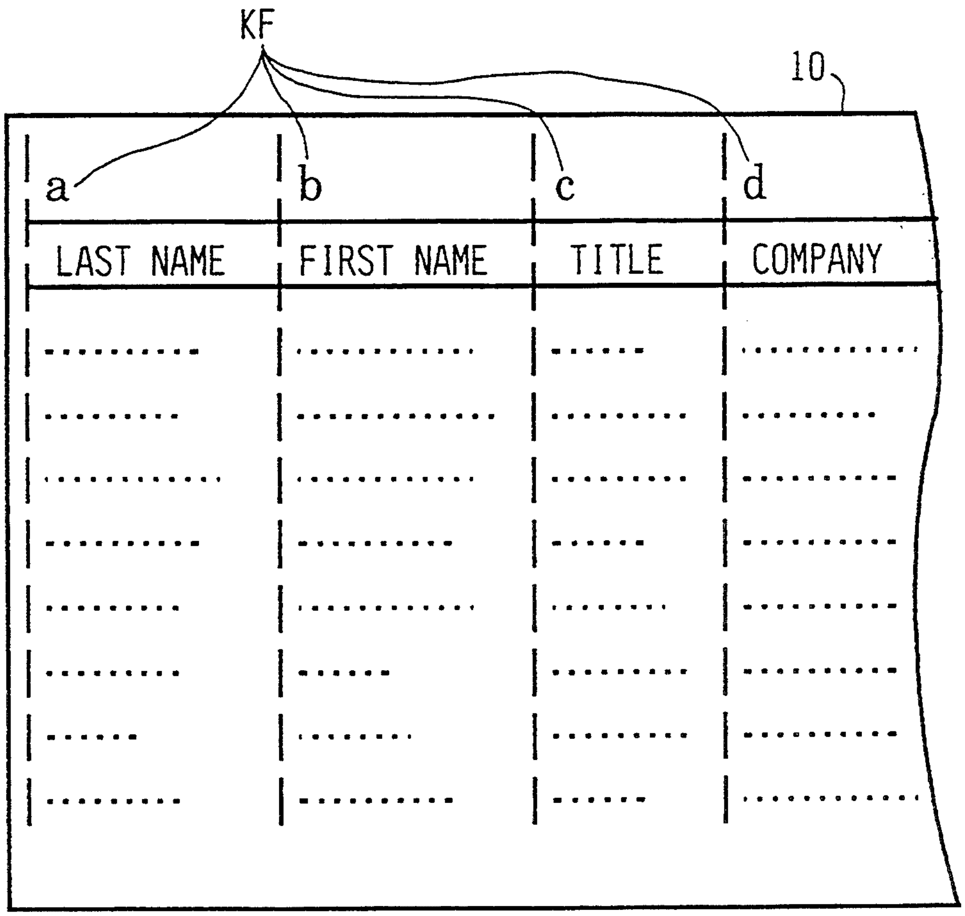
FIG. 10 is a diagram of a displayed example of an address book stored in a data memory.

Plural input document data is stored in the text memory 21, while plural item-title data such as "address", "name", "title with company" and so on are stored in the data memory 22 in a predetermined order for the purpose of managing an address book listing clients. Additionally, the item-content data for a series of clients which are input in accordance with (corresponding to) the respective item-titles are classified for every client with plural such entries being stored in the data memory 22. Thus, the specific characters comprising the item contents for the item-title defined categories are input individually for each client, so that after such data entry (usually done prior to performance of the present invention), each item content will have predetermined character data associated therewith. Further, indicia (item signs) such as, for example, characters (a, b, c, . . . ) which represent each different item-title, from a first (or top) item-title to a last item-title are successively stored in a series of successive addresses which includes a specific address as a first address thereof. As shown in FIG. 10, the indicia are provided in association with the item-titles. The address for each of the indicia (or item-signs) is hereinafter referred to as an "item-sign address". Thus, each type of item-title has a corresponding item-sign, with the contents of each item-title being stored beginning at a respective item-sign address.

An item-sign pointer 23 stores one of the plural item-sign addresses previously stored in the data memory 22. The value (content) of the item-sign pointer 23 serves as an item-sign point value KNP. An item-sign memory 24 stores an item-sign data KF (i.e., the indicia for each item-title), wherein a specific (selected) item-sign is indicated by the item-sign point value KNP. An item-sign range memory 25 stores an address of the item-sign for the last item (LKFA) entered as address-book data. A display range memory 26 stores the maximum number (e.g. ten) of item-titles which can be displayed simultaneously on the item-title displaying area (KE) of the display 10. The display range memory 26 stores the top display address TLA for an item sign which is displayed at an uppermost line in the item-title displaying area (KE) and the bottom display address (BLA) for an item sign which is displayed on a lowermost line of the item-title displaying area (KE). A print flag memory 27 is provided with 20 print flags PF, the number of 20 corresponding to the maximum number of introducible items (in the present example 20), and stores a flag data (logic "1") of a print flag PF to be set in response to a print instruction.

The print instruction for setting the print flags PF is made for every item-title (each of which has an item-sign KF), so that each item-title has a print flag PF(KF) containing a selected item sign as a parameter.

A set print-position memory 28 is provided with, for example, 20 line memories and 20 column memories whose numbers correspond to the maximum number of introducible items (that is, 20) in order to store a print position (set in the paper-imitating area PE) for each selected item-title by using values of a line number (LPNT) within the paper-imitating area by counting from a top line therein, and a column number (CPNT) within the paper-imitating area by counting from a top column therein. The line number (LPNT) and column number (CPNT) are also used to define print positions of the contents of their respective item-titles on the printing paper. The line number LPNT and the column number CPNT are stored for each item-title as a line number LPNT(KF) and a column number CPNT(KF), both of which contain the item sign of a selected item-title as a parameter. A print position setting memory 29 stores the item-title which is instructed to be printed and the print position thereof in association with each other (together) therein.

A cursor display-position memory 30 stores a display position of the cursor 43 on the paper-imitating area while renewing the display position by a cursor display line CSLP and a cursor display column CSCP. Logic "1" is stored in the cursor display line CSLP when the cursor 43 is located at the uppermost line in the paper-imitating area PE. Logic "1" is also stored in the cursor display column CSCP when the cursor 43 is located at the far left end in the paper-imitating area PE.

An area setting memory 31 stores a top limit value TLC, a bottom limit value BLC, a left end limit value LCC and a right end limit value RCC of the paper-imitating area which can be defined on the display 10. A flag memory 32 stores: both the flag data of a flag SF which is set to instruct a printing operation, and the flag data of a set flag TF when at least one print flag PF(KF) has been set; the flag data of a cursor shift flag CSF; and the flag data of an error flag EF, which is set in response to occurrence of an error.

A print-position setting control routine which is executed in the control device C of the word processor now will be described with reference to the flowcharts of FIGS. 4A to 9A. In the figures, Si (i=10, 11, 12, . . . ) represents each step.

Prior to performance of the control routine of the present invention, address-book data, as shown in FIG. 10, is stored in the data memory 22. Thus, the item-titles for plural items such as "LAST NAME", "FIRST NAME", "TITLE", etc. and the item contents of the respective items for a series of clients are classified in accordance with the number of the clients, and plural pairs thereof (i.e., each pair comprising the title name and a content for that title name) are stored in the data memory 22. Therefore, each item content is stored in data memory 22 paired with the appropriate item-title.

After other information including a print pitch, a tab pitch, a label paper size, etc. are stored in the address-book print menu, the control routine is started by operating, for example, the print key. Upon operation of the print key: a top item-sign address TKFA is stored in the item-sign point value KNP; logic "0" is stored in each of the plural set lines LPNT(KF) and set columns CPNT(KF) respectively; plural print flags PF(KF) and flags SF,TF and EF are reset (i.e., set to logic "0"); the top item-sign address TKFA is stored in the top display address TLA; and, in the present example, (TKFA+9) is stored in the bottom display address BLA. Further, each value for specifying a range (size) of the paper-imitating area PE is determined on the basis of the print pitch, the tab pitch and the size of the label 9A which have been stored in memory. This determination is made while matching a number of characters which can actually be printed on the label 9A with a number of characters which can be displayed in the paper-imitating area PE. The respective calculated values are stored in the area setting memory 31. For example, "1", "5", "1" and "34" are stored as the upper limit value TLC, the bottom limit value BLC, the left end limit value LCC, and the right end limit value RCC, respectively in step S10.

Figure 11:
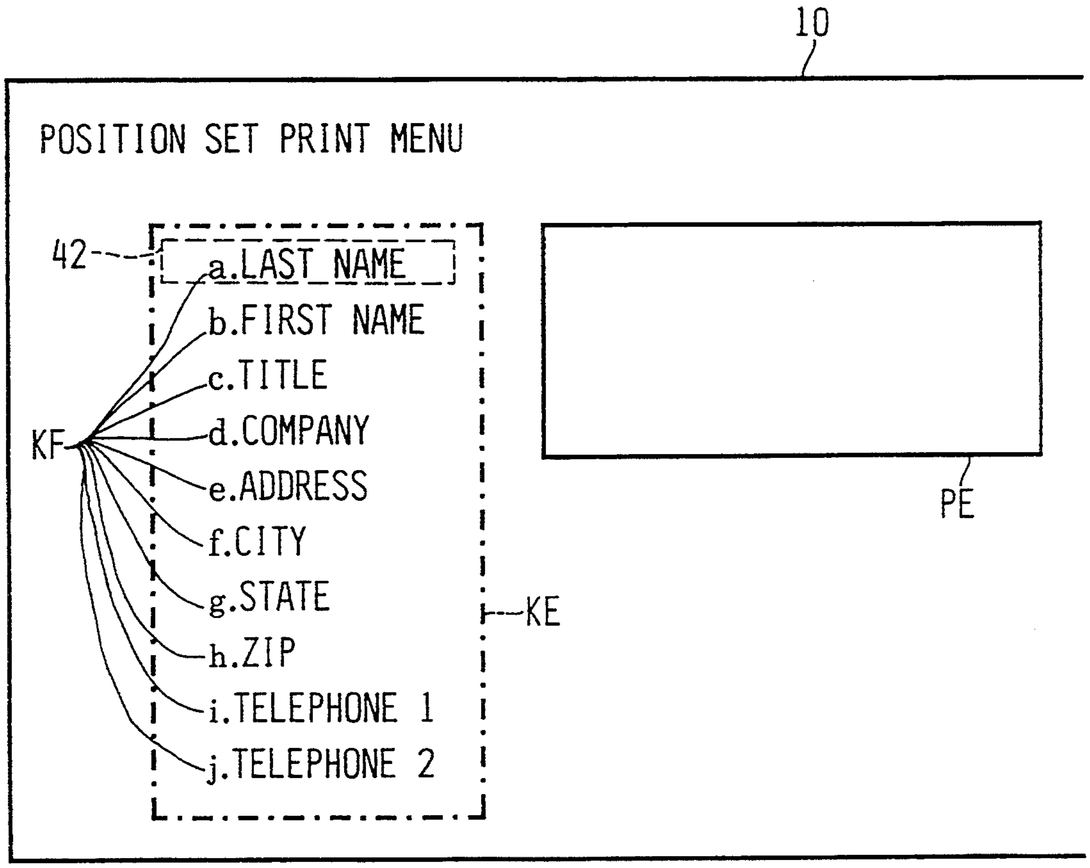
FIGS. 11 to 14 show examples of a display screen used to illustrate the print position setting control of the present invention.

Next, plural item-titles are read from the data memory 10, and the item signs assigned to each of the respective item-titles (along with the item-titles) are displayed in the item-title displaying area KE on the display 10 in steps S11 and S12 (see FIG. 11). The paper-imitating area PE having a size (in this example) of 5 lines×34 columns which corresponds to a size of the set-up label paper is displayed having an outline in a step S13, and then a block cursor 42 is superposedly displayed on an item-title on the top display line of the item-title displaying area KE in step S14. For example, as shown in FIG. 11, a top group of item-titles (from a large set of item-titles), that is, ten item-titles such as "LAST NAME" to "TELEPHONE 2" and the ten item signs "a" to "j" which are assigned to these item-titles are displayed in the item-title area KE of the display 10. Additionally, the block cursor 42 is superposedly displayed on the first item-title "LAST NAME".

Figure 4A:
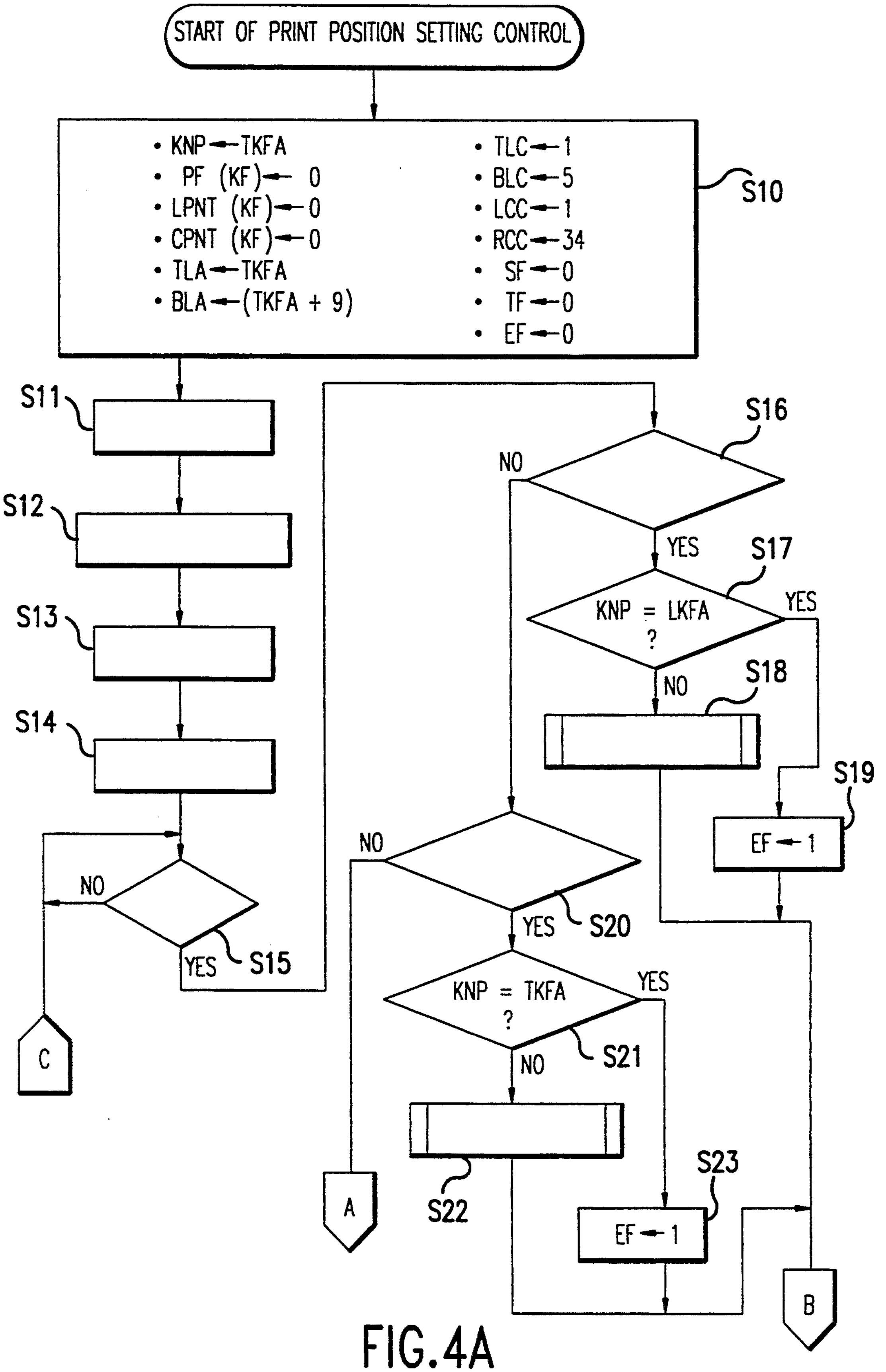
Figure 5A:
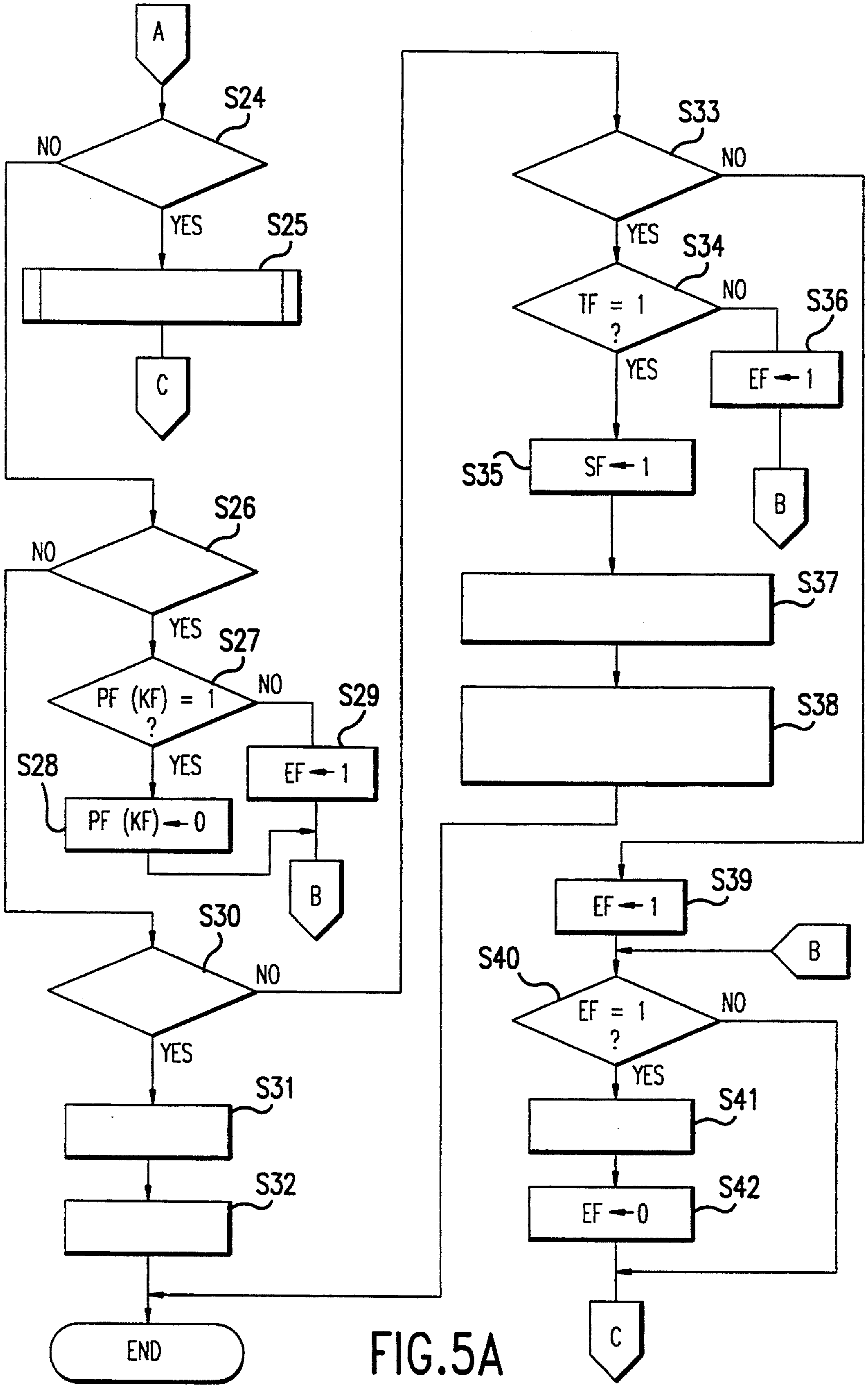
Figure 6A:
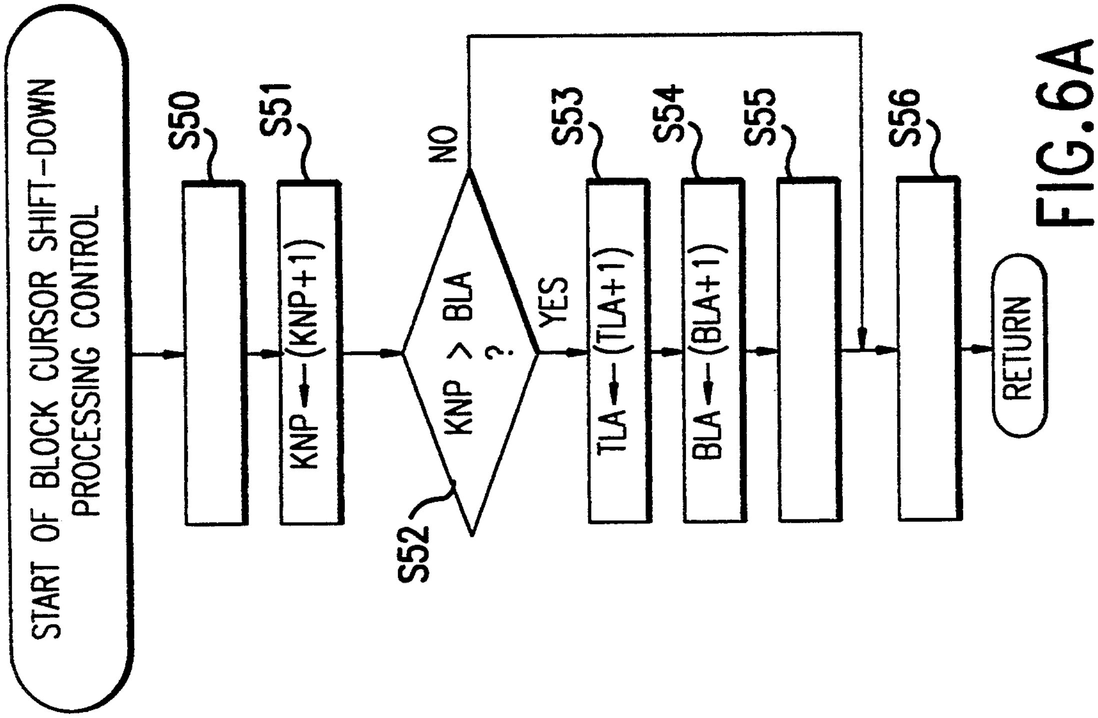

Next, when, for example, a cursor shift-down key is operated to select another item-title (that is, steps S15 and S16 are judged as "Yes"), a cursor shift-down processing control (as shown in FIG. 6A) is executed in step S18 if an item-sign point value KNP is not equal to the last item sign address LKFA (that is, step S17 is judged as "No"). Upon start of the cursor shift-down processing control, the block cursor 42 is erased in step S50, and the item sign point value KNP is incremented by one in step S51. Further, if the item sign point value KNP is below the bottom display address BLA (that is, step S52 is judged as "No"), the block cursor 42 is superposedly displayed on an item-title (for example, "FIRST NAME") just below the item-title previously displayed by the block cursor 42 (that is, "LAST NAME") on the basis of the item sign point value KNP in step S56. Then this processing control is finished, and processing is returned to the print position setting control processing as shown in FIG. 4A.

When the item sign point value KNP is larger than the bottom display address BLA (that is, step S52 is judged as "Yes"), both the top display address TLA and the bottom display address BLA are incremented by one in steps S53 and S54, and the displayed item-titles are scrolled upwardly by one item-title due to the incrementing of the addresses TLA and BLA, so that one item-title is removed from area KE, and one item-title is added to the area KE, and thus a different group of ten item-titles are displayed on the item-title displaying area KE in step S55. Thereafter, the program is returned through step S56 to the print position setting control processing as shown in FIG. 4A.

Figure 7A:
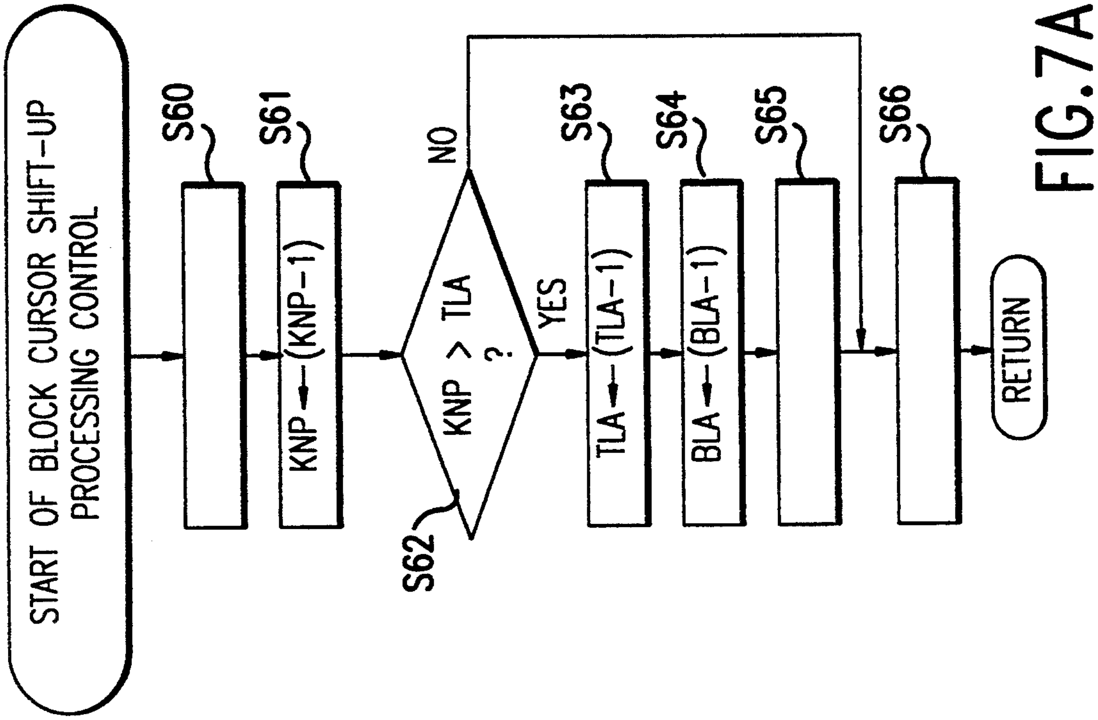

When a cursor shift-up key is operated (steps S15, S16 and S20 are judged as "Yes", "No" and "Yes" respectively) and the item sign point value KNP is not equal to the top item sign address TKFA (that is, step S21 is judged as "No"), the cursor shift-up processing control as shown in FIG. 7A is executed in step S22. Upon start of the cursor shift-up processing control as shown in FIG. 7A, the block cursor 42 is erased in step S60, and the item sign point value KNP is decremented by one in step S61. Further, if the item sign point value KNP is above the top display address TLA (that is, step S62 is judged as "No"), the block cursor 42 is superposedly displayed on an item-title just above the item-title previously displayed by the block cursor 42 on the basis of the item sign point value KNP in step S66. Then, this control processing is finished and flow is returned to the print position setting control processing as shown in FIG. 4A.

If the item sign point value KNP is below the top display address TLA (that is, step S62 is judged as "Yes"), both the top display address TLA and the bottom display address BLA are decremented by one in steps S63 and S64, and the ten item-titles are scrolled by one item-title on the basis of the changed (decremented) addresses TLA and BLA, so that one item-title is removed, and one item-title is added to area KE, and thus a different group of ten item-titles are displayed on the item-title displaying area KE in step S65. Thereafter, the cursor shift-up processing is returned through step S66 to the print position setting control processing as shown in FIG. 4A.

Figure 8A:
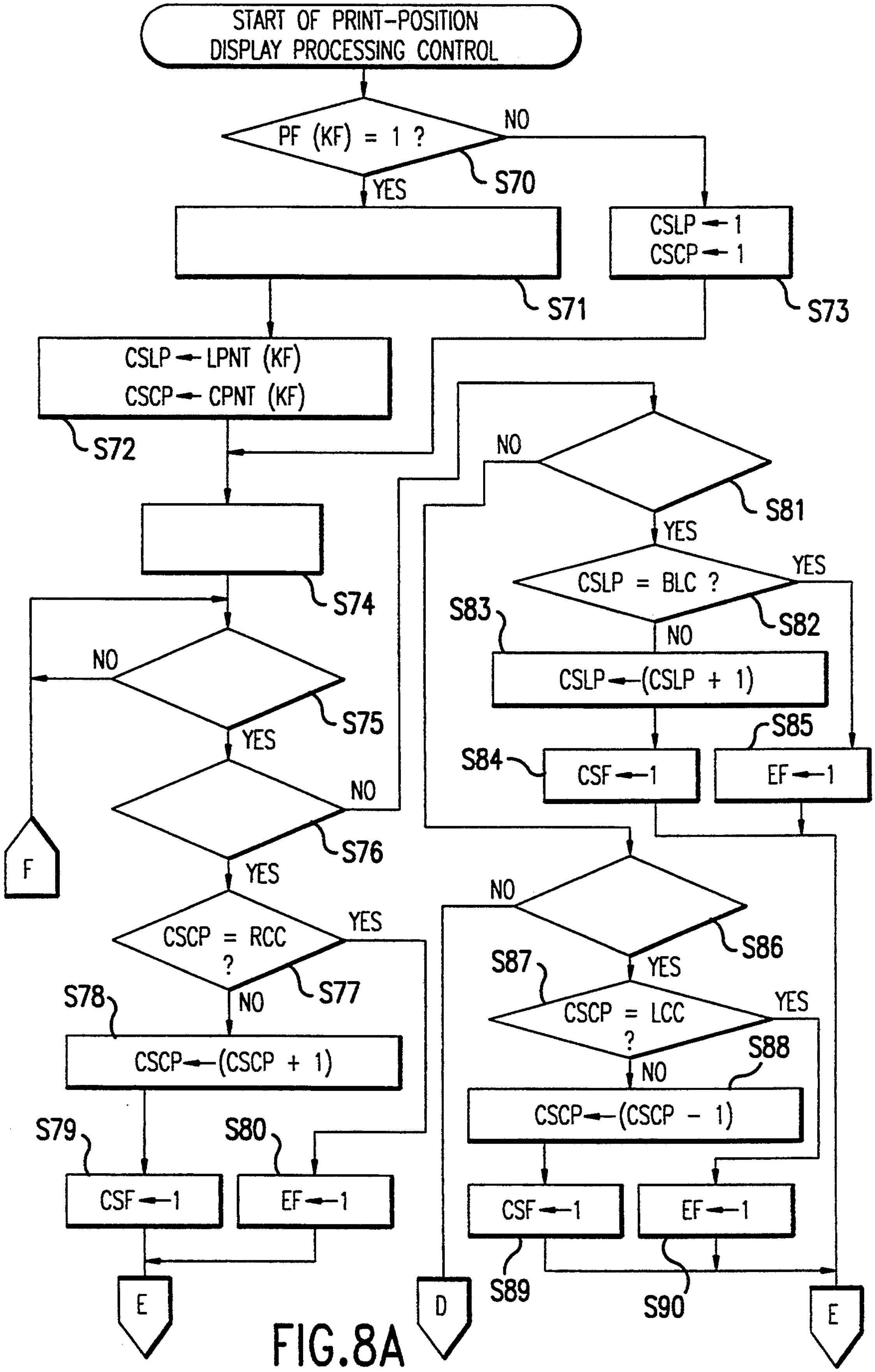
Figure 12:
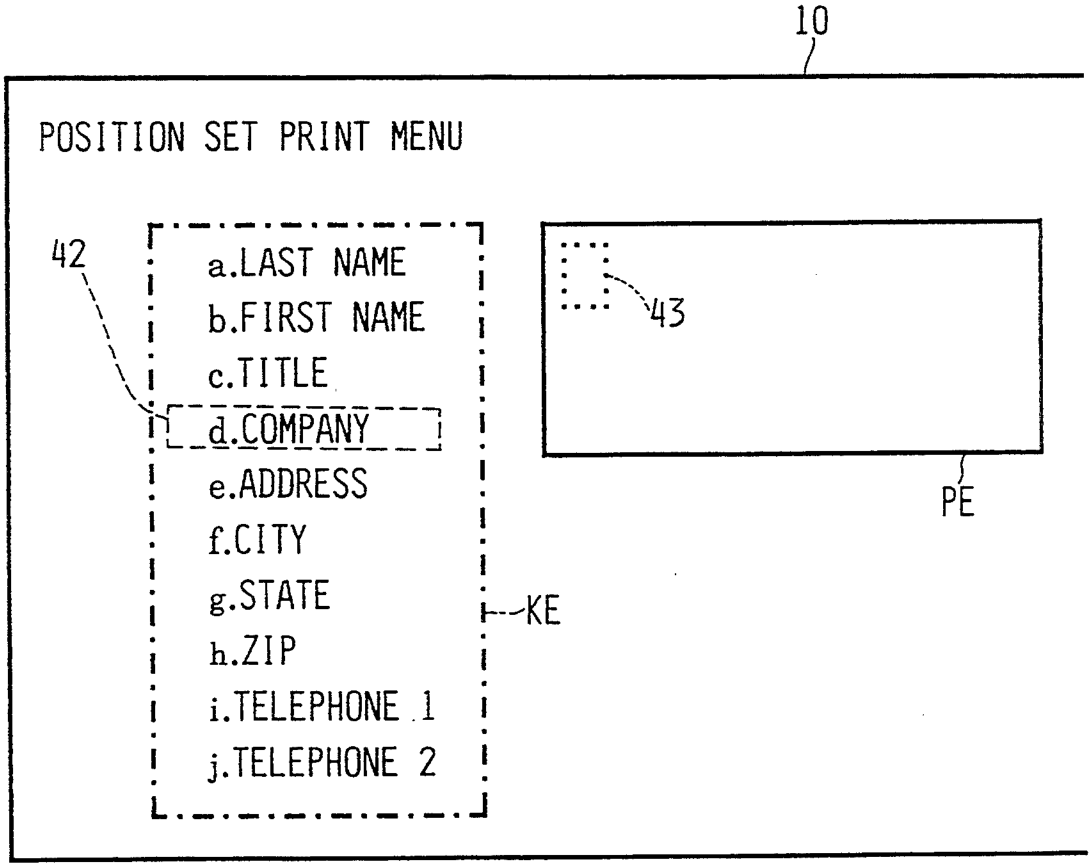

When the space key is operated (that is, the steps S15, S16, S20 and S24 (see FIG. 5A) are judged as "Yes", "No", "No" and "Yes" respectively), the print-position display processing control as shown in FIG. 8A is executed in step S25. If, upon starting the print-position display control processing as shown in FIG. 8A, the print flag PF(KF) of an item-title selected by the block cursor 42 is reset (that is, step S70 is judged as "No"), logic "1" is stored in the cursor display line CSLP and the cursor display column CSCP in step S73, and the cursor 43 is displayed at a home position (at the left end on the uppermost line) of the paper-imitating area PE in step S74. For example, as shown in FIG. 12, when the print flag PF(KF) corresponding to an item sign "d" for the item-title "COMPANY" which is selectively indicated by the block cursor 42 is reset, the cursor 43 is displayed at the home position of the paper-imitating area PE.

Figure 13:
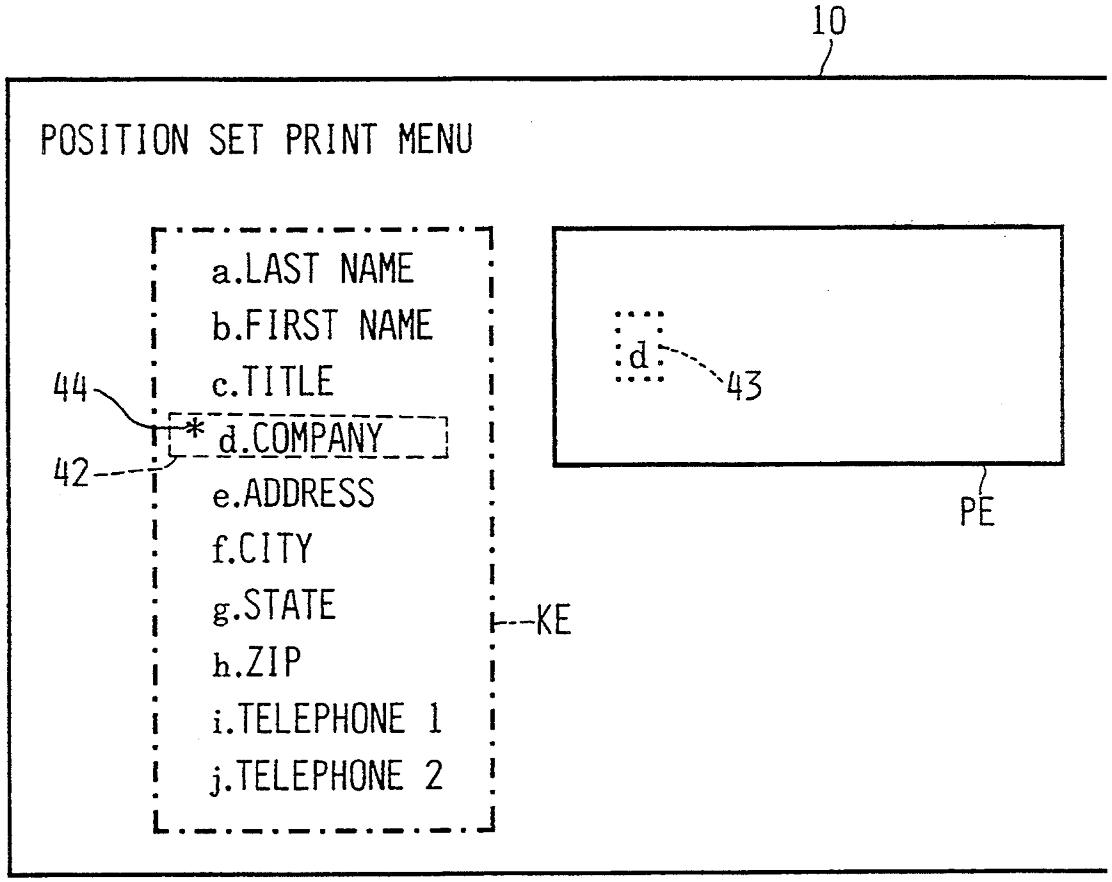

In this case, an operator is about to set a print position of an item content for the selected (indicated) item-title ("COMPANY"). However, in this example, assume that a print position for "COMPANY" was previously chosen. In such a case, the operator will notice the addition of a print mark "*" 44 next to the selected item-title as shown in FIG. 13. Thus, in this example, the operator is changing the print position of an item-title which has been previously set. Therefore, when the print flag PF(KF) for the selected item-title (KF=d) is previously set (that is, step S70 is judged as "Yes"), the item sign for the print flag PF(KF) and the print mark "*" 44 are first erased in step S71. Then, in step S72 the previously stored values of the set line LPNT (KF) and the set column CPNT (KF) are stored in the cursor display line CSLP and the cursor display column CSCP, respectively. Then the print-position displaying control processing is carried out from step S74, as described below.

Figure 9A:
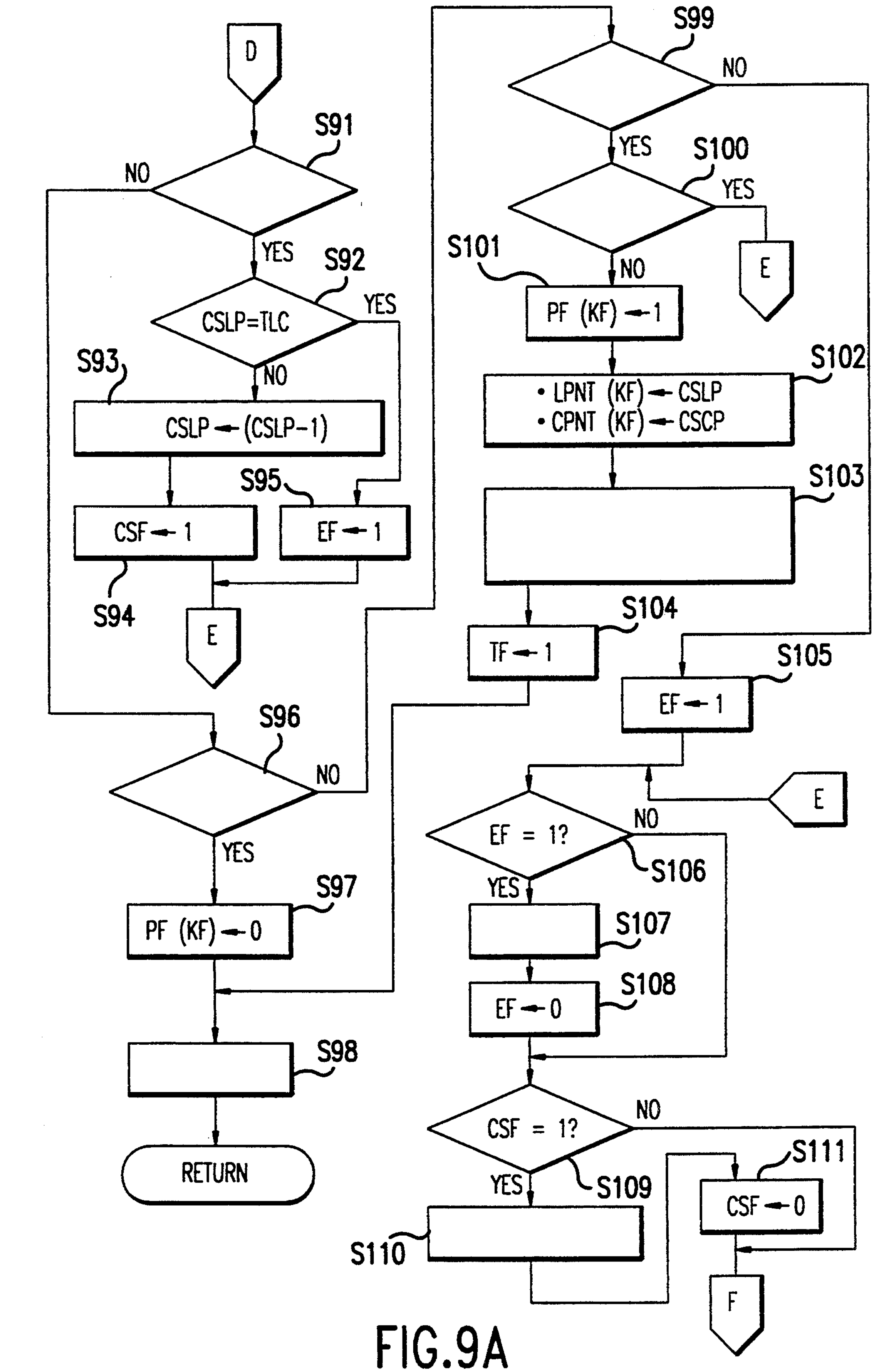

Thereafter, if the cursor shift-right key is operated (that is, steps S75 and S76 are judged as "Yes") and the cursor display column CSCP is not equal to the right end value RCC (that is, step S77 is judged as "No"), the cursor display column CSCP is incremented by one in step S78, and the cursor shift flag CSF is reset in step S79 (additionally, step S106 as shown in FIG. 9A is judged as "No"), so that the cursor 43 is displayed at a position just to the right of the previously displayed position (that is, step S109 is judged as "Yes" and step S110 is executed), the flag CSF is reset in step S111, and the processing proceeds to step S75 as shown in FIG. 8A. Thereafter, if the cursor shift-down key is operated (that is, steps S75, S76 and S81 are judged as "Yes", "No" and "Yes") and the cursor display line CSLP is not equal to the bottom limit value BLC (that is, step S82 is judged as "No"), the cursor display line CSLP is incremented by one in step S83, and then steps S84, S106, S109 to S111 are executed to display the cursor 43 at a display position just below the previously displayed one, and then the processing is returned to step S75.

When the cursor shift-left key is operated (that is, steps S75, S76, S81 and S86 are judged as "Yes", "No" "No" and "Yes" respectively) and the cursor display column CSCP is not equal to the left end value LCC (that is, step S87 is judged as "No"), the cursor display column CSCP is decremented by one in step S88, and then steps S89, S106 and S109 to S111 are executed to display the cursor 43 at a position just to the left of the previously displayed position. Then, the processing is returned to step S75. If the cursor shift-up key is operated (that is, the steps S75, S76, S81, S86 and S91 are judged as "Yes", "No", "No", "No" and "Yes") and the cursor display line CSLP is not equal to the top limit value TLC (that is, step S92 is judged as "No"), the cursor display line CSLP is decremented by one in step S93, and then steps S94, S106 and S109 to Sill are executed to display the cursor 43 on a display position just above the previous display position. Then, the processing is returned to step S75.

Next, when the return key is operated after the cursor 43 is shifted to a desired display position in the paper-imitating area PE (that is, step S75 is judged as "Yes" steps S76, S81, S86, S91 and S96 are judged as "No" and step S99 is judged as "Yes") and no item sign is displayed at the display position of the cursor 43 (that is, step S100 is judged as "No"), a print flag PF(KF) for the selected item sign is set in step S101, and a value of the cursor display line CSLP and a value of the cursor display column CSCP are stored in the set line LPNT(KF) and the set column CPNT(KF), respectively, in step S102. Additionally, the item sign for this set print flag PF(KF) is displayed at the display position of the cursor 43, the print mark "*" 44 is displayed in step S103, the flag TF is set to logic "1" in step S104, the cursor 43 is erased in step S98. At this time, the control processing is finished and flow is returned to FIG. 5A (S25).

For example, as shown in FIG. 13, the item sign "d" for the item-title "COMPANY" which is selected by the block cursor 42 is displayed at the display position of the cursor 43, the print mark "*" 44 is displayed at the left side of the item sign "d" in the item-title displaying area KE, and the print flag PF(KF) (where KF=d) therefor is set.

When the cancel key is operated (step S75 is judged as "Yes" steps S76, S81, S86 and S91 are judged as "No", and step S96 is judged as "Yes"), the print flag PF(KF) which is selected by the block cursor 42 is reset in step S97, and the control processing is returned through step S98. The flag EF is set in step S80 if step S77 is judged as "Yes" in step S85 if step S82 is judged as "Yes" in step S90 if step S87 is judged as "Yes" and in step S95 if step S92 is judged as "Yes". However, the flag EF is set in step S105 if step S99 is judged as "No", whereby the buzzer sounds an alarm at steps S106 and S107, and then the flag EF is reset at a step S108. Then, processing returns to step S75 (FIG. 8A) through step S109.

When the correct key is operated (that is, step S15 is judged as "Yes" steps S16, S20 and S24 are judged as "No" and step S26 is judged as "Yes") and the selected print flag PF(KF) is set (that is, step S27 is judged as "Yes" (see FIGS. 4A and 5A)), the print flag PF(KF) is reset, and the print mark "*" 44 for the print flag PF(KF) and the item sign in the paper-imitating area PE are erased in step S28. Further, when the cancel key is operated (that is, step S15 is judged as "Yes" steps S16, S20, S24 and S26 are judged as "No" and step S30 is judged as "Yes"), processing ceases by, for example, resetting all print flags PF(KF) which have been set, etc., in step S31. This permits an ending processing for the control processing to be carried out in step S32.

When the return key is operated (that is, step S15 is judged as "Yes" steps S16, S20, S24, S26 and S30 are judged as "No" and step S33 is judged as "Yes") and at least one print flag PF(KF) is set (that is, step S34 is judged as "Yes"), the print instruction flag SF is set in step S35, and printing positions of the item signs for all print flags PF(KF) which have been set are determined based on a currently-set print pitch, the set line LPNT(KF) and the set column CPNT(KF) in step S37. Additionally, the item sign to which a printing operation is instructed, that is, the item-title and the print position thereof, obtained in S37, are stored in the print position setting memory 29 in correspondence with each other in step S38, thereby completing this control processing.

The flag EF is set (to logic "1") in step S19 if step S17 is judged as "Yes", in step S23 if step S21 is judged as "Yes" in step S36 if step S34 is judged as "No" and in step S29 if step S27 is judged as "Yes". Additionally, the EF is set in step S39 if step S33 is judged as "No" whereby the buzzer 12 sounds an alarm in S40 and S41. Then, the flag EF is reset in step S42, and the processing returns to step S15.

Figure 14:
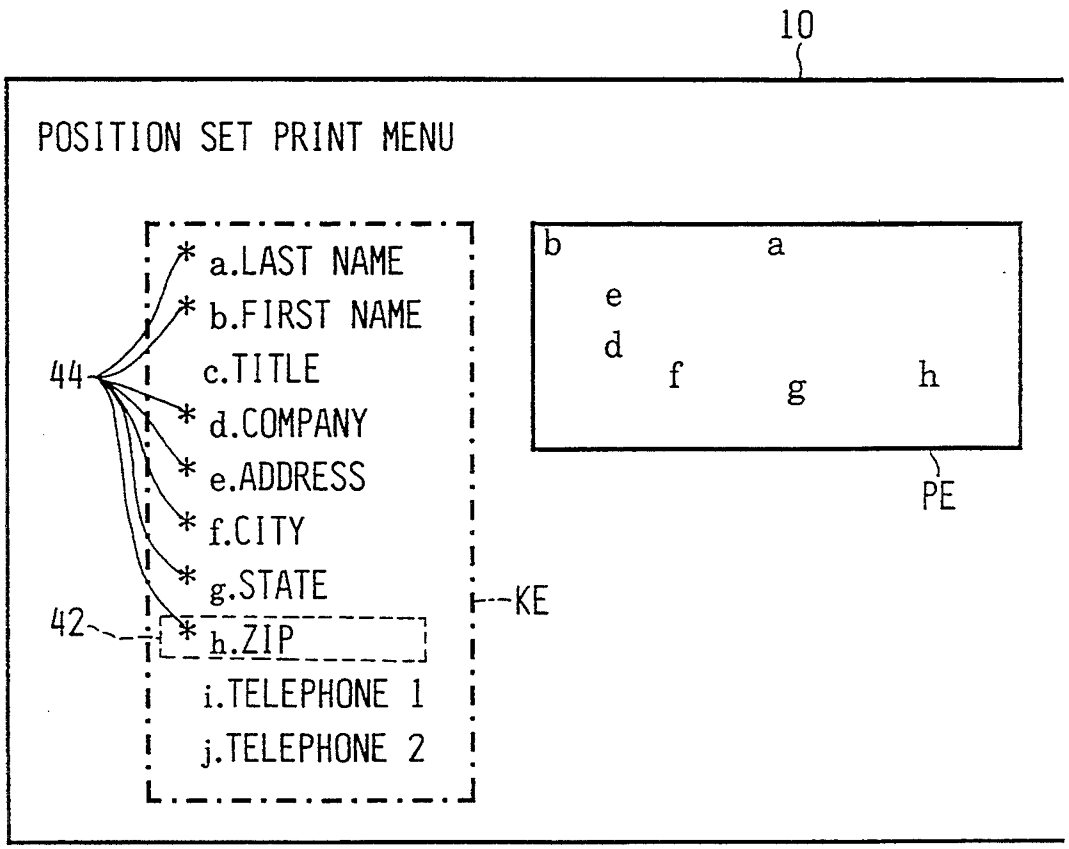

For example, as shown in FIG. 14, the item signs "a", "b", "d", "e", "f", "g" and "h " are displayed at desired print set positions, and these plural item-titles and the print positions thereof are stored in the print position setting memory 29 in correspondence with each other (or as respective pairs) when the return key is pressed. Thereafter, on the basis of the data stored in the print position setting memory 29, the item contents for the item-titles are printed at the print positions thus set for every label 9A of the label paper 9, thereby performing the label printing operation using the label printing control program.

As described above, since the paper-imitating area PE having the display profile corresponding to the shape of the label paper is displayed on the display 10, and the item sign for the selected item-title is also displayed in the paper-imitating area PE of the display, the print position can be easily set without a tentative printing operation because the print appearance (layout) of the item contents for the item-titles represented by the item signs can be ascertained by viewing the display 10. Additionally, since the item-titles and the printing positions of the item-titles on the label 9A are stored in association with each other (together) in the printing position setting memory 29, the item contents which are set in the paper-imitating area PE can be accurately printed at the desired printing position on the label 9A because the printing position corresponds to the set printing position in the paper-imitating area PE.

The printing position setting control may be partly altered to indicate a range of the printing position of each item-title (i.e., start and end positions for each item-title). Further, when plural item informations are successively continuously printed on the same line of the label paper while separating printed neighboring item informations with a space, it is possible to display the item signs for the item titles representing the respective neighboring item informations on the same line of the paper-imitating area without separating the neighboring item signs of these item-titles with spaces.

Furthermore, in the label printing operation, the types of the item contents (the item-titles) to be commonly used and the printing positions thereof may be stored in advance (preset) in the ROM 17 as default values, and plural item signs may be displayed in the paper-imitating area PE on the basis of the default values immediately after the printing position setting control is started.

Figure 15:
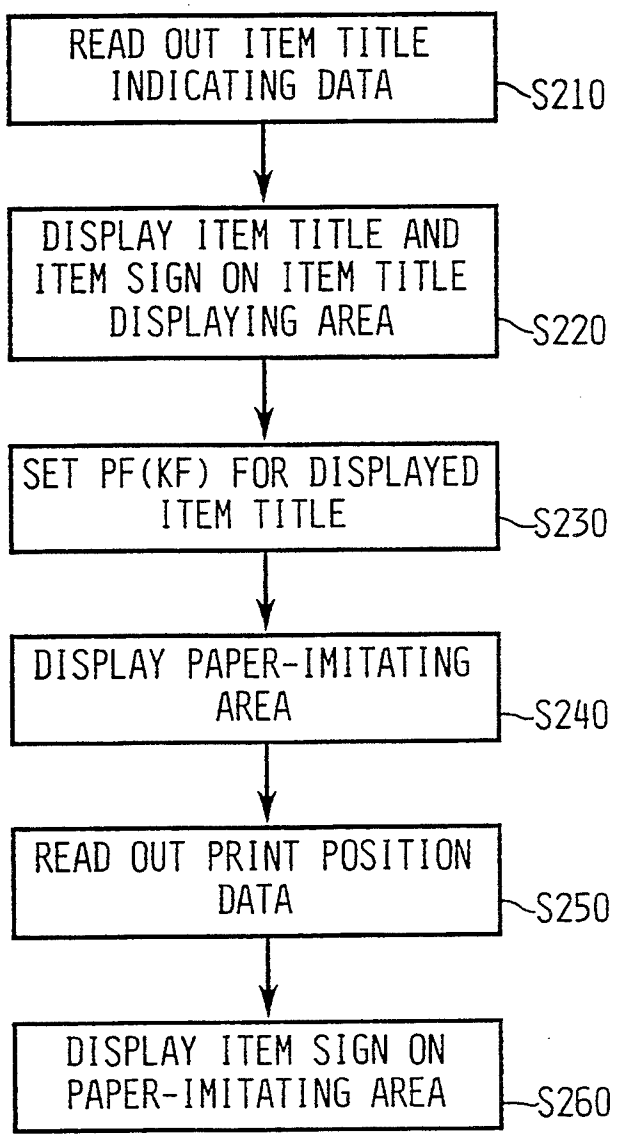
FIG. 15 is a flowchart of part of a print position setting routine according to a second embodiment wherein default values are stored in advance for preselected item-titles.

In the above situation, item-title indicating data for indicating a commonly-used item-title(s) out of all of the item-titles which are stored in the data memory (as illustrated in FIG. 10), and a printing position determined by a default value for each item-title are preset in the ROM 17. Thereafter, steps S11 to S13 for the printing position setting control as shown in FIG. 4A are altered as shown in FIG. 15. At step S210, the item-title indicating data is read from the ROM 17. Next, in step S220, an item-title indicated on the basis of the item-title indicating data and the item sign thereof are displayed in the item-title displaying area KE. Thereafter, in step S230, a print flag PF(KF) for each default item-title is set, and in step S240 the paper-imitating area PE is displayed.

Next, in step S250, the printing position data is read from the ROM 17, and in step S260 the read-out printing position data (thus, the item signs for the respective displayed item-titles) are displayed on the paper-imitating area PE. The subsequent control steps are similar to step S14 as shown in FIG. 4A and the subsequent steps as described above.

The item-title indicating data stored in the ROM 17 serves to indicate the item-titles stored in the data memory 10, and thus the item contents for the item-titles can be read from the data memory as described above.

In the above embodiment, the document processing device according to this invention is applied to a word processor for processing English documents. However, this invention can be applied to various types of document processing devices having the address-book function and the label printing function such as word processors or electric typewriters for use with European documents and Japanese documents, and in a personal computer.

Additionally, it is understood that the specific keys described for performing specific functions are merely illustrative, other key combinations, or data input means, such as, for example, a mouse, or a touch screen, could also be used. Furthermore, the specific manner in which selected items are represented on the display could differ from what was described above. For example, items selected in item-title area KE could be highlighted or displayed with a distinctive font, instead of using block cursor 42 or print marks 44. The item-title could be displayed in imitating area PE instead of the item sign KF of stored item-titles.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A document processing device including input means for inputting characters and instruction signals, a data memory for storing item-title data for a plurality of items and item-content data which are input in correspondence with the respective items, said item-title data and item-content data being input and stored in advance to a print position setting operation, and display means having a display unit capable of displaying characters over a plurality of lines, said document processing device further comprising:

display control means for displaying a plurality of item-titles read from the data memory in an item-title displaying area in a first section of said display unit based upon a displaying instruction input from said input means, and for concurrently displaying in a second section of said display unit a paper-imitating area corresponding to a shape of a print sheet on which item contents in the data memory are to be printed; and print position setting means, responsive to a print position setting instruction, for instructing said display control means to display indicia representative of a selected item-title from the plurality of item-titles at a selected one of a plurality of positions within the paper-imitating area of said display unit, a location of the selected one of the plurality of positions being adjustable within the paper-imitating area to obtain a desired display position for the representative indicia within the paper imitating area, the print position setting means storing, in association with each other, the selected item-title and a print position for printing contents of the selected item-title on a print paper, said print position corresponding to the display position set in the paper-imitating area.

2. The device of claim 1, further comprising:

a printing mechanism for printing characters on the print paper; and printing commanding means, responsive to a print command instruction, for causing said printing mechanism to print item-content data stored in said data memory on the print paper in accordance with the stored selected item-titles and corresponding print positions.

3. The device of claim 1, wherein said print position setting means is capable of storing a different print position for each different type of item-title selected.

4. The device of claim 1, wherein said display control means also identifies each item-title in said item-title displaying area for which a print position has been set by said print position setting means.

5. The device of claim 4, wherein said display control means identifies each item-title for which a print position has been set by displaying a print mark in said item-title displaying area adjacent to said set item-title.

6. The device of claim 1, wherein said indicia representative of a selected item-title is a character distinctive to the selected item-title.

7. The device of claim 6, wherein said display control means also displays a corresponding character distinctive to each respective item-title adjacent to each item-title displayed in said item-title displaying area.

8. The device of claim 1, further comprising:

selecting means for selecting a desired item-title from the item-titles displayed in the item-title displaying area; and indicating means for indicating a desired position within the paper imitating area; and wherein said print position setting means, upon receipt of said print position setting instruction, instructs said control means to display the indicia representative of the item-title selected by said setting means at the position in said paper imitating area indicated by said indicating means, and stores said selected item-title and indicated position in a print-position setting memory.

9. The device of claim 8, wherein said display control means identifies the desired item-title in said item-title displaying area selected by said selecting means.

10. The device of claim 9, wherein said display control means identifies the desired item-title by displaying a block cursor around said desired item-title.

11. The device of claim 8, wherein said display control means indicates the desired position within the paper imitating area by displaying a cursor at said desired position.

12. The device of claim 11, wherein said indicating means includes a plurality of cursor keys capable of causing said display control means to move said cursor within said paper imitating area.

13. A document processing device for performing a printing operation for a document in accordance with data representing items and printing positions of the items, which are stored in a memory comprising:

input means for inputting characters and instructions;

a data memory for storing item-title data for a plurality of items input with said input means, and item-content data which are input with said input means in correspondence with the respective item-titles in such a manner that the item-title data and the item-content data are matched with each other;

display means including a display unit for displaying characters over several lines in a group, the display unit being divided into a first section and a second section, the first section displaying an item-title displaying area in which input item-titles are displayed, and the second section concurrently displaying a paper-imitating area in which a profile corresponding to the shape of a print paper is displayed;

display control means for controlling the display means to display a plurality of item-titles read from the data memory in the item-title displaying area in accordance with a display instruction provided from the input means;

selecting means for selecting a desired item-title from the item-titles displayed in the item-title displaying area;

indicating means for indicating a selected one of a plurality of positions within the paper-imitating area, a location of the selected one of the plurality of positions being adjustable within the paper-imitating area to obtain a desired position; and print position setting means, responsive to a print position setting instruction from the input means, for instructing the display control means to display indicia representative of the item-title selected by the selecting means at the desired position within the paper-imitating area as indicated by the indicating means, and for storing, in association with each other, the selected item-title, or the item content thereof, and a printing position for the print paper corresponding to the indicated position on the paper-imitating area.

14. A method of setting printing positions for a plurality of items to be printed on a print sheet using a document processing device having item-content data for said plurality of items stored in a data memory in accordance with item-title data distinguishing said plurality of items by title-type, said document processing device including a display means having a display unit capable of displaying characters over a plurality of lines, said method comprising the steps of:

displaying a plurality of item-titles read from said data memory in an item-title displaying area in a first section of said display unit;

concurrently displaying a paper imitating area in a second section of said display unit corresponding to a shape of the print sheet on which the item contents in the data memory are to be printed;

setting print positions for selected items to be printed on said print sheet, in response to a print position setting instruction, by displaying indicia representative of the selected items at a selected one of a plurality of positions within said paper imitating area of the display unit; and adjusting a location of the selected one of the plurality of positions within the paper-imitating area to obtain desired positions for the representative indicia within the paper-imitating area, said desired positions being stored in association with a corresponding selected item in a print position setting memory.

15. The method of claim 14, further comprising, prior to setting a print position for an item:

selecting one of the item-titles displayed in said item-title displaying area; and indicating a desired print position within said paper imitating area for said selected item-title.

16. The method of claim 14, wherein said document processing device includes a printing mechanism for printing characters on the print paper, said method further comprising:

causing said printing mechanism to print item-content data stored in said data memory on the print paper in accordance with the stored selected item-titles and corresponding print positions in response to a print command instruction supplied by a printing commanding means.

17. The method of claim 14, wherein a different print position for each different type of selected item-title is stored in association with a corresponding item-title in the print position setting memory, and the indicia representative of each selected item-title is displayed at a corresponding desired position in said paper imitating area.

18. The method of claim 14, further comprising:
identifying each item-title for which a print position has been set by displaying a print mark in said item-title displaying area adjacent to said set item-title.

19. The method of claim 15, further comprising:
identifying the selected item-title by displaying a block cursor around said selected item-title.

20. The method of claim 15, wherein the desired position within the paper imitating area is indicated by displaying a cursor at said desired position.

21. The method of claim 14, wherein said adjusting the location of the selected one of a plurality of positions within the paper-imitating area is done while displaying the representative data within the paper-imitating area.

* * * * *